Jan. 31, 1933.                G. VLAHOV                1,895,871
                              AEROPLANE
                       Original Filed July 2, 1928
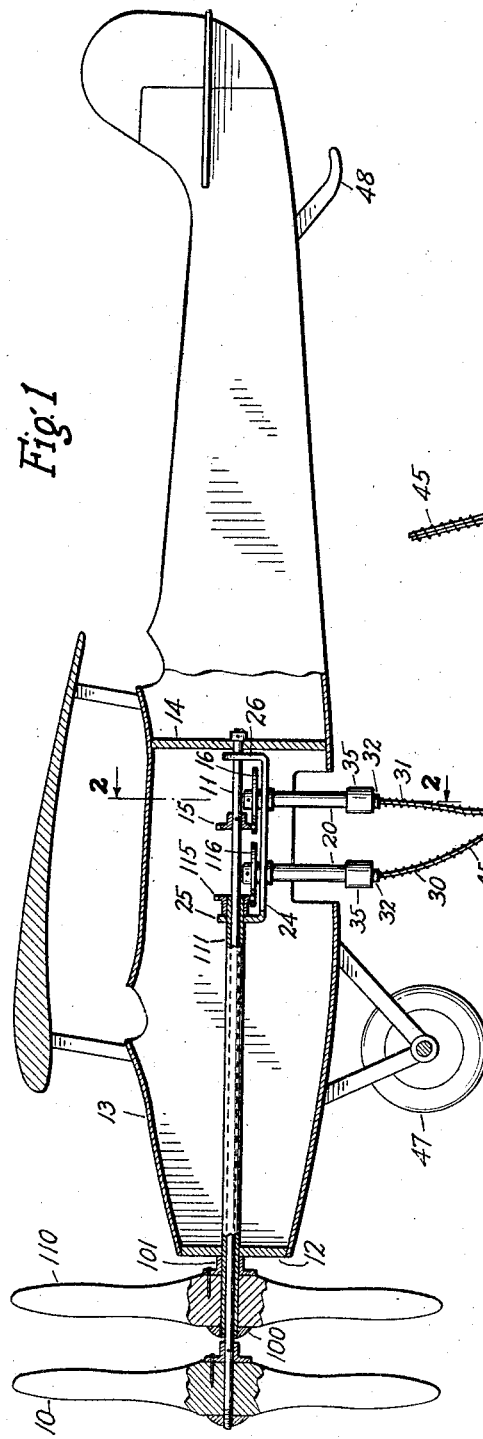
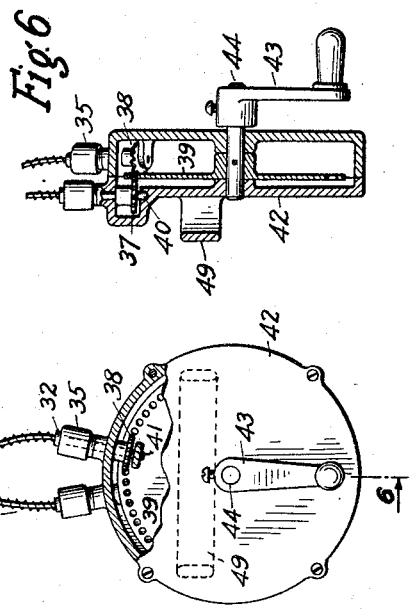
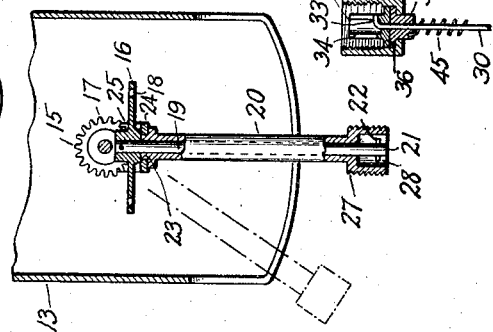
INVENTOR
George Vlahov
BY
Harry Jacobsen
ATTORNEY Patented Jan. 31, 1933

1,895,871

UNITED STATES PATENT OFFICE

GEORGE VLAHOV, OF NEW YORK, N. Y., ASSIGNOR TO JOHN HOLTZMAN, OF NEW YORK, N. Y.

AEROPLANE

Application filed July 2, 1923, Serial No. 289,998, and in Canada July 2, 1927. Renewed July 22, 1931.

This invention relates to toy aeroplanes, and contemplates, among other things, the provision of a source of motive power entirely outside of the plane for rotating the coaxially mounted propellers.

In toys of the type referred to, the motor has usually been carried by the plane itself, and has taken various forms which add materially to the weight of the plane. My invention includes the provision of a distant source of power not carried by the plane, but which is operatively connected to the independently mounted and coaxially arranged propeller shafts and which is under the control of the operator at all times, while the plane is allowed to fly freely in all directions and at various controlled speeds within a definite range, and for an unlimited period of time.

The invention contemplates further improvements in the art of flying aeroplanes including control thereof from terra firma and allowing continuous flight for an unlimited period and at any desired speed while the operator is enabled to reverse the action of the driving mechanism to show the plane up and to reverse the direction of flight, if desired. The various objects of my invention will be clear from the description which follows and from the drawing, in which, Fig. 1 is a side elevation and partial vertical section of my improved plane.

Fig. 2 is a partial vertical section and side view of a part of the plane and of the driving mechanism therefor, taken on the line 2—2 of Fig. 1, and showing in dotted lines the position which may be assumed by certain of the parts when the plane is in flight.

Fig. 3 is an enlarged vertical section of the coupling which connects the flexible cable with the driving mechanism of the plane and with the source of power.

Fig. 4 is a top plan view of the same.

Fig. 5 is a front view and partial vertical section of the gear box embodying a proposed form of the motive power.

Fig. 6 is a vertical section of the same, taken on the line 6—6 of Fig. 5.

In one of the many practical embodiments of my invention, as illustrated, I prefer to use a pair of propellers rotating in opposite directions for eliminating torque tending to spin the plane. One of the propellers 10 is mounted on one end of the shaft 11 in the usual manner, said shaft being suitably journalled near the other end thereof in the partition 14. On said shaft is fixed a suitable gear such as the spur gear 15. Meshing with said gear and preferably arranged at right angles thereto, is the larger perforated gear 16. The teeth 17 of said spur gear enter the perforations 18 of the gear 16 whereby rotation of the perforated gear will cause rotation of the propeller 10.

A second propeller 110 is mounted on the hollow propeller shaft 111 in the usual manner as by means of the nut 100 and the bushing 101, said shaft being supported by the head 12 of the fuselage 13 and by the solid propeller shaft 11. The drive for the hollow shaft 111 is similar in all respects to that for the shaft 11 and consists of the spur gear 115 and the perforated gear 116 preferably identical with the gears 15 and 16 respectively.

The supports for the perforated gears and the couplings which operatively connect said gears to the flexible drive shafts are preferably identical, so that only one of the supports and couplings need be described. Each of the perforated gears is mounted on a shaft 19 passing through the bearing 20. Near the lower end of the shaft 19 as at 21, is a pin 22 projecting outside thereof to form an anchor for the coupling 29. The bearing 20 is secured at the upper end 23 thereof to the swingable frame 24 which is preferably U-shaped, having upstanding arms 25 and 26 engaging and pivotally mounted on the shafts 111 and 11 respectively. The lower end 27 of the bearing 20 is externally threaded and has an opening 28 therein of suitable size to receive the coupling 29.

Rotation of the shafts 19 is effected by means of flexible shafts as 30 and 31 of thin music wire or the like. Each of said shafts passes through a bushing 32 into the interior of the hollow coupling 29. The end 33 of each of the flexible shafts is bent at substantially right angles to the remainder and is forced into one of the narrow slots 34 made longitudinally of and in the wall of the coupling, whereby the flexible shaft is firmly secured to said coupling. Each of said couplings together with the bushing 32 therefor, is loosely inserted into the internally threaded nut 35, which is adapted to be secured in threaded engagement with the end 27 of the bearing 20.

To couple the shaft 19 to one of the flexible shafts, the nut 35 is moved downwardly past the bushing 32 to expose the coupling 29. The pin 22 is then inserted into the slots 34, the coupling 29 entering the opening 28 of the bearing. The nut 35 is then screwed on to the end 27 until the threaded extremity of said end is close to the flange 36 of the coupling, whereby the parts are firmly secured together and the flexible shaft and the shaft 19 caused to rotate as a unit inside of the bearing 20.

The source of power through which the flexible shafts are driven is preferably located on terra firma and is at all times under the control of the operator. The range of flight of the plane is, of course, limited by the length of the flexible shafts. When the plane is in full flight, it may be pulled by the flexible shafts toward the operator who would usually stand toward one side of the plane. The flexible shafts, therefore, tend to pull the gears 16 and the shafts 18 on which they are mounted, together with the frame 24 to one side, and might exert an undesirable drag on the plane tending to tilt the plane or to reduce the speed or stop the flight. It is for the purpose of preventing undue tilting and for minimizing the pull or drag of the flexible shafts on the gears 16 that the supporting frame 24 is swingably mounted on the propeller shafts.

It will be seen that the gears 16 are so mounted and supported that when the flexible shafts are for any reason pulled out of the vertical when the plane is flown in a circle about the operator, the frame 24 is swung about the shafts 11 and 111, carrying with it the gear 16 into a position wherein the least pull is exerted on the plane and tendency toward tilting is practically eliminated. If only one propeller were used, the entire plane might be caused to spin about the shaft 19 as an axis when the flexible shaft and said shaft 19 are rotated. It is in order to prevent any such spinning effect largely that I have provided two propellers rotating in opposite directions and consequently rotating the shafts 19 similarly. I am able to overcome this disadvantageous spinning effect therefore and to operate the plane in a proper and normal manner by the use of two flexible shafts.

For rotating said shafts, any suitable means distant from the plane may be provided. For economy and simplicity, however, I prefer to use a hand motor including spur gears 37 and 38 arranged on opposite sides of the perforated gear 39 and supported on the shafts 40 and 41 respectively in the gear box 42, whereby the shafts 40 and 41 are rotated in opposite directions on the rotation of the gear 39. A crank 43 is mounted on the shafts 44 on which the gear 39 is carried and serves to rotate said shaft and the gear 39 thereon at the will of the operator and at any suitable speed desired. It will be understood that the plane may be caused to take off, to alight, to dive and to perform tricks by starting, stopping and varying the speed of rotation of the crank. The flexible shafts 30 and 31 are suitably connected to the shafts 40 and 41 as by means of pins similar to the pins 22 provided at the lower ends of the shafts 19, and by couplings and nuts similar to those provided at the upper ends of the shafts 30 and 31.

For preventing kinking or knotting of the flexible shafts 30 and 31, a suitable flexible housing as 45 is provided therefor. Said housing may consist of a length of thin wire wound loosely as in the form of a helical coil spring about said flexible shafts, sufficient clearance being left to allow the rotation of said shafts in said housing without undue friction, interference or restraint. To secure the ends of the housing in place, each end may be inserted into a suitable hole in one of the bushings 32 provided in connection with the couplings 29.

The upper part of the fuselage 13 may be covered except at the cockpits and the wings made hollow so that the current of air from the propellers causes the fuselage and wings to act as sounding boxes or boards, thereby exaggerating the noise made by the propeller and simulating the sound of a full-sized plane in flight.

The operation of my device is as follows:
The plane is set up on the ground to rest on the wheels 47 and on the skid 48. When the gear box 42 is used, said box may be held in the hands of the operator as by passing one hand through the band 49, closing the hand about the box, and using the other hand to rotate the crank 43. The operator may stand on the ground or at an elevated point, and by rotating the crank 43, thereby rotates the flexible shafts 30 and 31, the perforated gears and spur gears, whereby the shafts 11 and 111 and the propellers 10 and 110 are driven.

When sufficient speed has been imparted to the propellers, the plane will roll along the ground in the usual manner and then rise into the air to begin its flight. As will be obvious, the crank 43 may be replaced by an automatic source of power such as a motor provided with suitable controls if desired. It will be understood that the range of flight is limited by the lengths of the shafts 30 and 31 and that the plane is under the control of the operator at all times.

Should it be desired to make the plane fly higher, then the crank 43 is merely turned faster, and should it be desired to cause the plane to perform the usual acrobatic tricks, rotation of the crank is slowed or stopped, thereby lessening or cutting off the power and sending the plane into a nose dive from which it may be righted into normal flying position by again rotating the crank and imparting forward movement to the plane. By the proper adjustment of the wings as will be readily understood, the plane may be caused to perform other tricks. It may be brought to the ground gradually and caused to alight in simulation of the action of a full sized plane by gradually reducing the speed of rotation of the propeller. The flight of the plane may be maintained for an unlimited period due to the independent arrangement of the source of power outside of, entirely independently of, and at a distance from the plane.

Should a poor start be made, or should the plane head toward an obstacle, the operator may, by reversing the direction of rotation of the shafts 30 and 31 either through the hand crank or motor, so slow up the plane that it may be stopped quickly or even reversed, thereby obtaining an efficient braking effect.

It will be understood that various changes may be made from the preferred structure shown and described, which would fall within the spirit and scope of this invention and within the range of equivalents afforded by the appended claims.

I claim:

1. A flying device including a fuselage, a partition in the fuselage, two propellers of opposite pitch and rotatable in opposite directions simultaneously, an inner shaft for one of the propellers supported by the partition and by the fuselage, an outer shaft for the other propeller, a source of motive power outside of the device, a gear on each of said shafts, a pair of swingable gears each meshing with one of the gears of the propeller shafts, a swingable bracket carrying both of the swingable gears, a pair of flexible shafts, and means for connecting each of said swingable gears with the source of said motive power, comprising a shaft for the swingable gear, a cross pin therefor, and a slotted sleeve secured to the flexible shaft and adapted to have the cross pin removably inserted into the slot thereof.

2. A flying device including two propellers of opposite pitch, concentrically arranged propeller shafts, each carrying one of said propellers and means including a pair of flexible shafts extending outside of the device and a relatively stationary motor operatively connected to said shafts for rotating said propellers in opposite directions a single housing for the greater part of both of said flexible shafts, and separate housings for the end portions of said flexible shafts.

3. In a flying device, propeller means therefor, revoluble flexible shafts extending outside of the device for transmitting power to said propeller means and a flexible housing for said shafts comprising a single wire wound in spaced turns about the greater part of both of said shafts, said shafts being spaced apart at both ends thereof.

4. In a toy aeroplane operated from a distant source of power, a pair of coaxially mounted propellers of opposite pitch, a flexible shaft operatively connecting each of the propellers to the source of power, and a single flexible housing for the major part of both of said flexible shafts.

5. In a toy aeroplane, a pair of concentric shafts, a propeller on each of said shafts, flexible shafts extending outside of the device and geared to each of said propeller shafts and means mechanically connecting said flexible shafts to a distance source of power including a slotted sleeve having an axial opening therein through which the flexible shaft passes and into the slot of which the end of the flexible shaft is bent.

6. In a toy aeroplane, a pair of concentric propeller shafts, a propeller at the end of each of said shafts and means outside of the aeroplane and movable independently of the movement thereof for rotating the propellers simultaneously in opposite directions, said means including a rotatable perforated gear wheel, and a flexible shaft operatively connecting the gear wheel to each of the propeller shafts.

7. In a toy aeroplane, a fuselage, wings on said fuselage, a pair of concentric propeller shafts mounted within the fuselage and projecting forwardly thereof, a U-shaped bracket mounted at one end on one of said propeller shafts and at its other end on the other of said shafts and swingable about the axes of said shafts, a gear carried by each of said shafts, a pair of gears carried by said bracket and each meshing with a gear on the propeller shaft, a pair of flexible shafts each connected at one end with one of the gears on the bracket and means at the other ends of said flexible shafts for rotating the flexible shafts simultaneously in opposite directions, said means being movable in all directions independently of the movement of the aeroplane.

8. In a toy aeroplane, a pair of concentric propeller shafts, a gear on each of said shafts, a perforated gear meshing with each of said gears, a pair of flexible shafts each connected to one of said perforated gears at one of the ends thereof, and means, including a perforated gear, operatively connected to the other ends of said flexible shafts for rotating the flexible shafts in opposite directions when the second-mentioned perforated gear is rotated in one direction.

9. In a toy aeroplane, a propeller shaft, a swingable shaft at substantially right angles thereto, intermeshing gearing on said shafts, a cross pin at the lower end of the swingable shaft, a sleeve for removably engaging said cross pin, and a flexible shaft secured to said sleeve.

10. In a toy aeroplane, a pair of concentric propeller shafts, a propeller at the end of each of said shafts, a flexible shaft for each of the propeller shafts, means for operatively connecting each of the flexible shafts to one of the propeller shafts, said means being adapted to swing about the axes of the propeller shafts for varying the angular relation of the aeroplane to said flexible shafts on the tilting of the aeroplane about its longitudinal axis, and means for rotating said flexible shafts in opposite directions simultaneously including a main gear wheel, a gear wheel on each of said flexible shafts meshing with the main gear wheel and disposed relatively to said main gear wheel to rotate in opposite directions, and means for rotating said main gear wheel.

11. In a toy aeroplane, a pair of concentric propeller shafts, a gear on each of said shafts, a driving gear meshing with each of the shaft gears, means for supporting the driving gears for movement therewith about the axes of said propeller shafts and maintaining the driving gears in engagement with said shaft gears, a pair of flexible shafts each connected to one of said driving gears at one of the ends thereof, and means operatively connected to the other ends of said flexible shafts for rotating said flexible shafts in opposite directions, comprising a driven gear at each of said other ends of said flexible shafts, a main gear in operative engagement with said driven gears and arranged to rotate said driven gears in opposite directions, and means for rotating the main gear.

12. In a toy aeroplane, a fuselage, wings on said fuselage, a pair of concentric propeller shafts mounted within the fuselage, a propeller on each of said shafts, and means operatively connected to said shafts for rotating said shafts in opposite directions including a pair of flexible shafts, a gear at each end of each of said flexible shafts, means for operatively connecting the gear at one end of each of said flexible shafts to each of the propeller shafts, and means for rotating the gears at the other ends of said flexible shafts in opposite directions.

13. In a toy aeroplane, a fuselage, wings on the fuselage, a pair of coaxially mounted propellers of opposite pitch, a flexible shaft operatively connected to each of the propellers, and means independent of the aeroplane and adapted to be supported on the ground for rotating the flexible shafts in opposite directions and thereby to supply power to rotate the propellers and to cause the aeroplane to fly, said means being mounted independently of the aeroplane.

14. In an aeroplane, a horizontally extending elongated fuselage, substantially horizontally extending wings carried by and arranged transversely of the fuselage, said wings being of sufficient area to support the aeroplane in flight, a pair of propellers of opposite pitch arranged in front of the fuselage, a horizontal shaft for one of the propellers, said shaft being arranged longitudinally of the fuselage, a second shaft concentric with the first-mentioned shaft for the other propeller, means carried by the fuselage and adapted to continuously transmit power for rotating said shafts in opposite directions to prevent displacement of the fuselage and of the wings carried thereby about the axes of said propellers by reason of the torque created by the rotation of either of said propellers, and means for controlling the speeds of rotation of the shafts while the aeroplane is in flight.

GEORGE VLAHOV.